Dec. 19, 1961  J. B. SPELLER ETAL  3,014,133
STAR TRACKER
Filed June 23, 1958  5 Sheets-Sheet 1
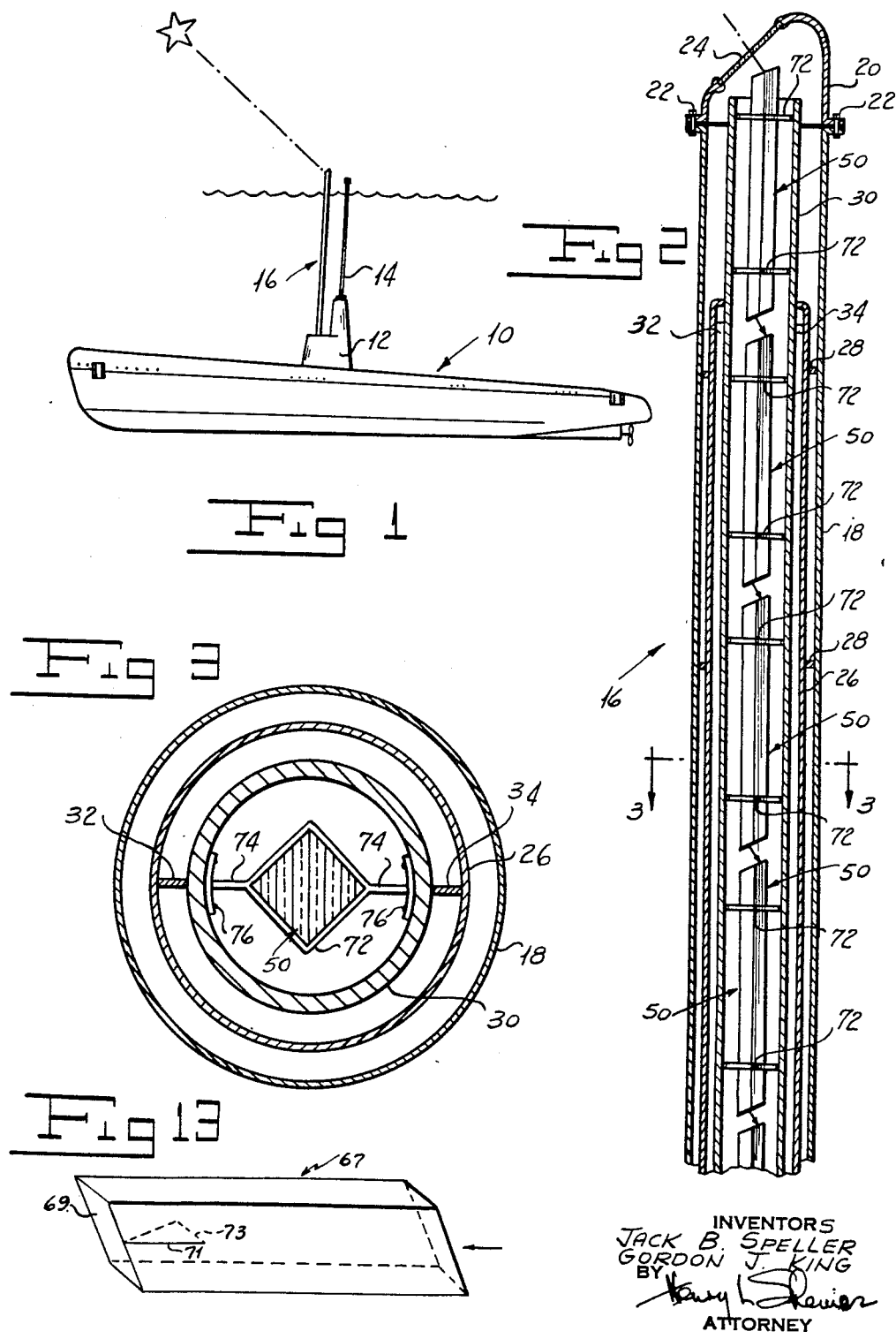
INVENTORS
JACK B. SPELLER
GORDON J. KING
BY
ATTORNEY Dec. 19, 1961  J. B. SPELLER ETAL  3,014,133
STAR TRACKER
Filed June 23, 1958  5 Sheets-Sheet 2
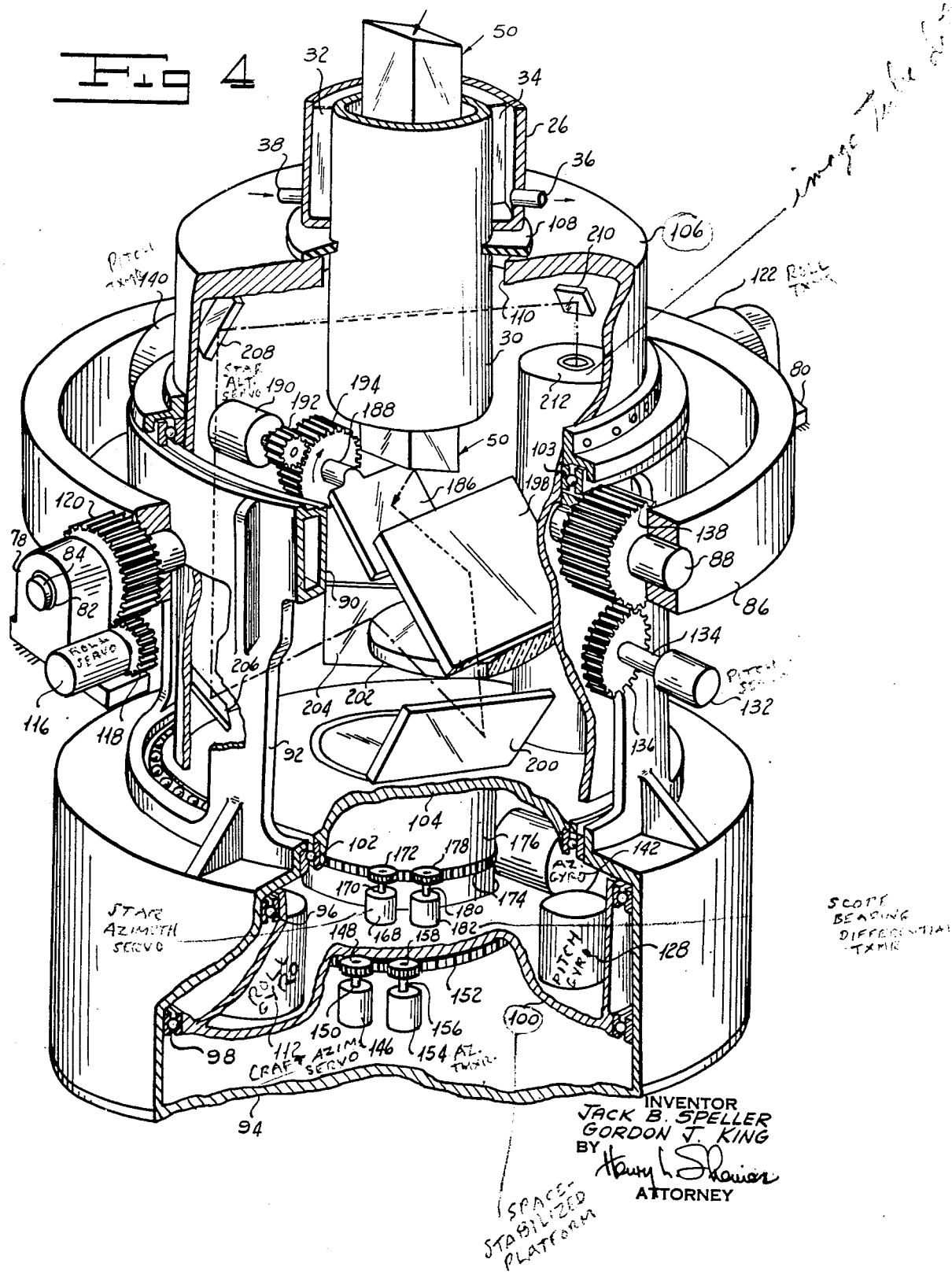
INVENTOR
JACK B. SPELLER
GORDON J. KING
BY
ATTORNEY Dec. 19, 1961 J. B. SPELLER ETAL 3,014,133
STAR TRACKER
Filed June 23, 1958 5 Sheets-Sheet 3
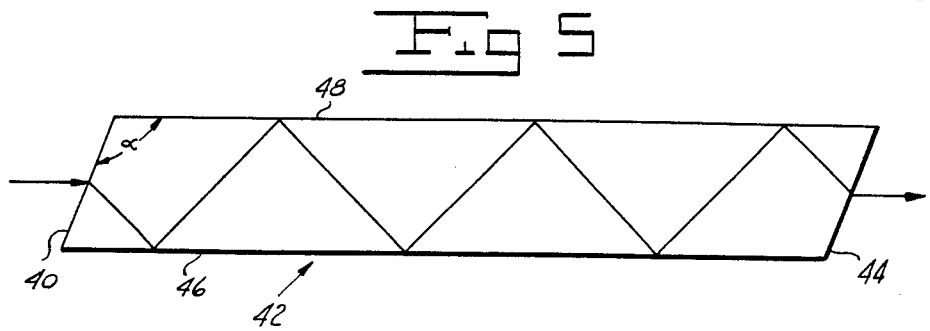
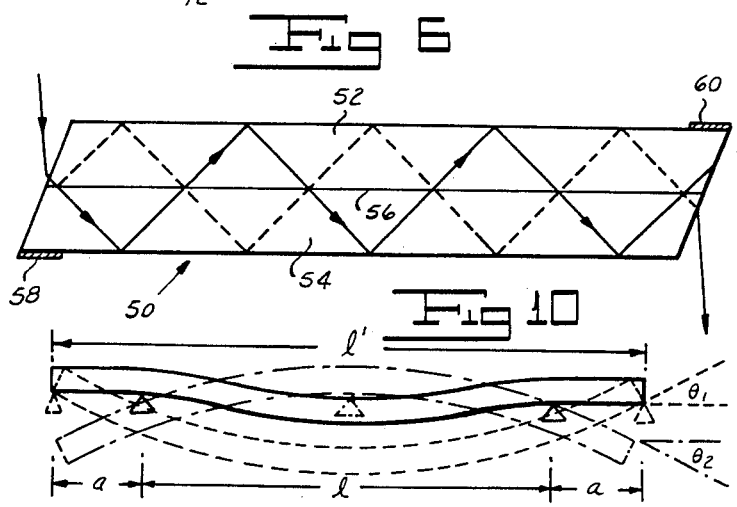
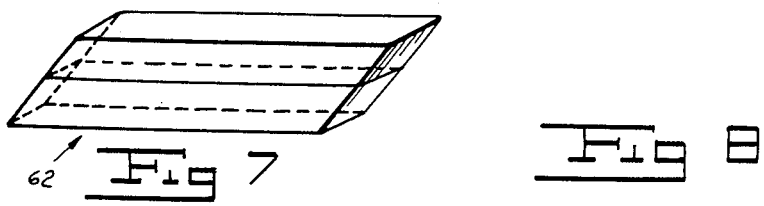
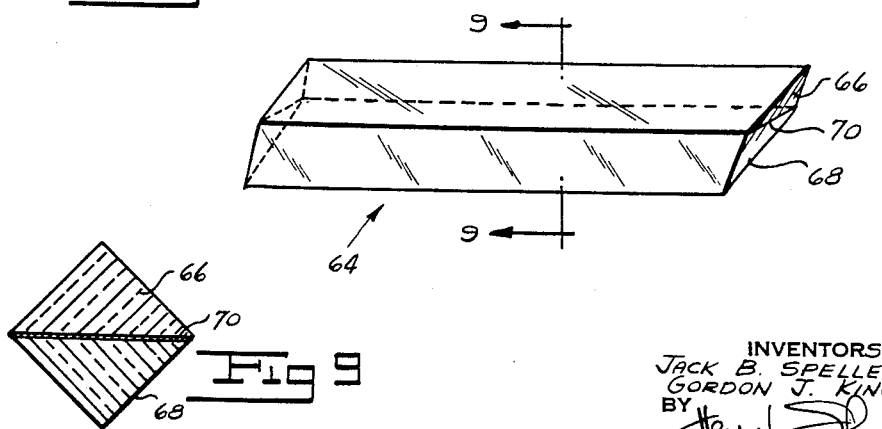
INVENTORS
JACK B. SPELLER
GORDON J. KING
BY
ATTORNEY

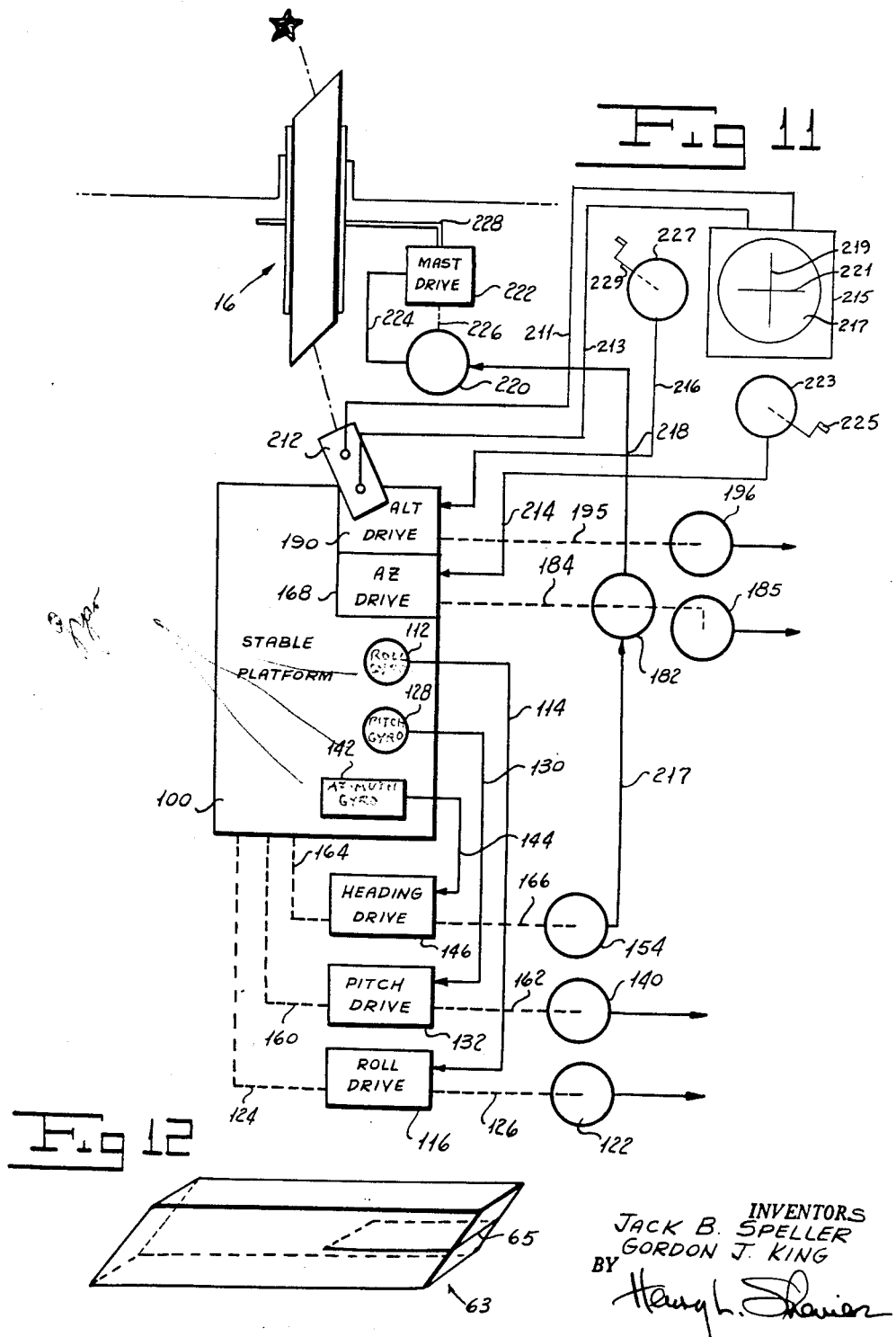

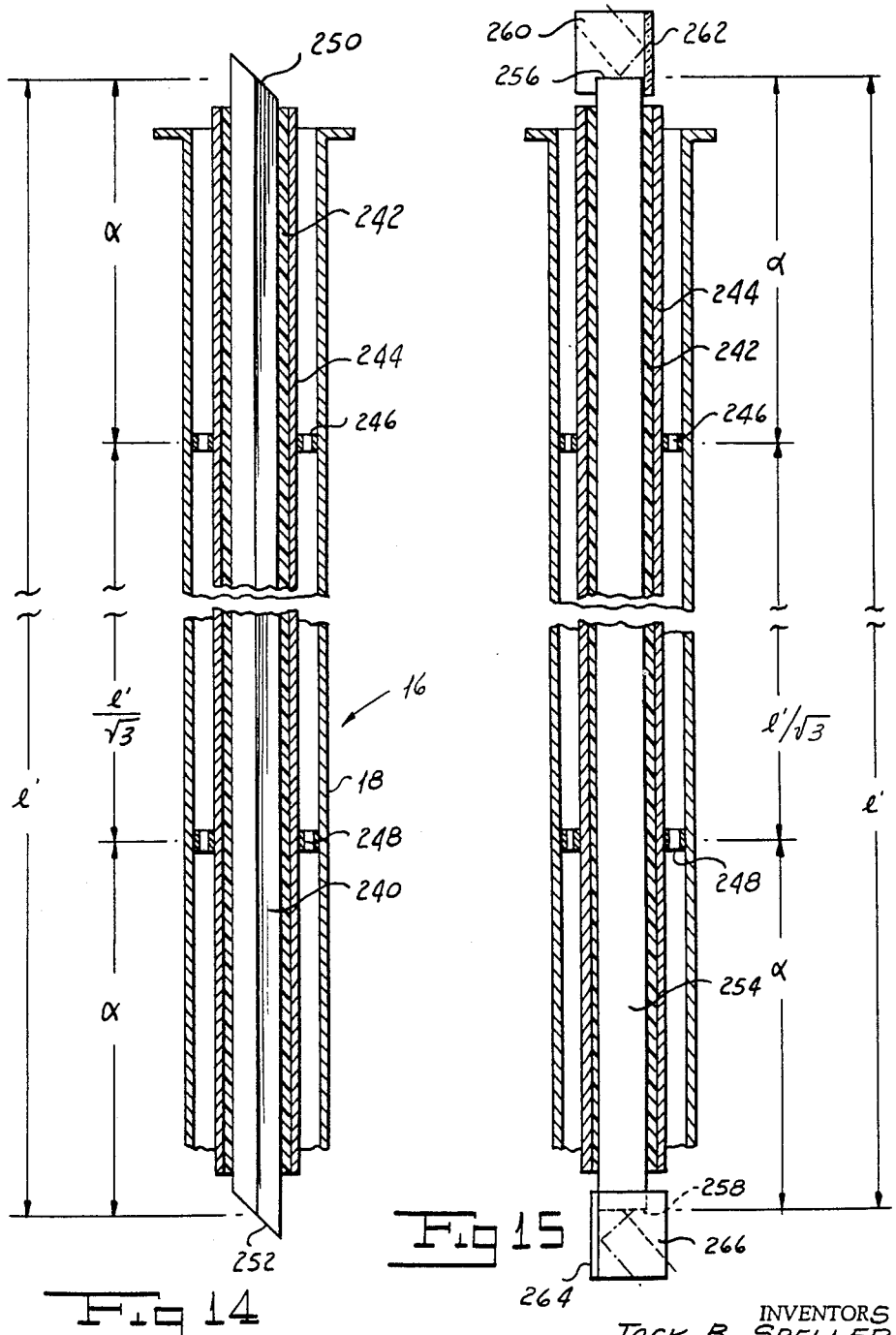

United States Patent Office 3,014,133
Patented Dec. 19, 1961

3,014,133
STAR TRACKER
Jack B. Speller, Chappaqua, and Gordon J. King, South Salem, N.Y., assignors, by mesne assignments, to United Aircraft Corporation, East Hartford, Conn., a corporation of Delaware
Filed June 23, 1958, Ser. No. 743,869
20 Claims. (Cl. 250—203)

Our invention relates to a star tracker and more particularly to a star tracker by means of which a celestial body such as a star may be observed and tracked from a submerged vessel such as a submarine.

Modern submarines are capable of cruising while submerged for long periods of time with the result that they have a wide submerged cruising range. It is desirable that the position of a submerged submarine be known at all times. It is especially necessary that the position of the submarine be determined accurately when for example a missile or the like is to be launched from the submerged submarine. A small error in the calculated position at the time a missile is fired results in a miss.

No means is known in the prior art by which a submerged submarine can accurately determine its position. At present only an approximate position of the submarine can be determined by dead reckoning from the last navigational fix obtained when the vessel was surfaced. It will be appreciated that it is desirable that a submarine be able to navigate by the stars while submerged. This necessitates observation of celestial bodies to determine their azimuth and altitude from the submerged submarine. If a line of sight could be translated parallel to itself from the top of a mast extending above the surface of the water to the bottom of the mast in the submerged submarine, it would be possible to observe celestial bodies while submerged. This has not been possible in the prior art. Bending of the long mast which may be as long as forty feet is so great as to interfere with a line of sight from bottom to top of the mast. Further if optical elements for translating the line of sight are placed in the mast, whipping of the mast introduces errors which are multiplied over the length of the mast to produce an overall error which is so great that it renders observations worthless for navigational purposes.

We have invented a star tracker which permits the true azimuth and elevation of a celestial body to be determined from a submerged submarine. Our tracker includes an optical system which translates a line of sight from the top of a mast or periscope to the bottom of the mast without substantial error. Our tracker is arranged to prevent substantial error from being introduced into the system under the whipping action of the mast. Our tracker enables the navigator of a submerged submarine accurately to locate the submarine on the earth's surface.

One object of our invention is to provide a star tracker for accurately measuring the true azimuth and altitude of a celestial body from a submerged submarine.

Another object of our invention is to provide a star tracker which permits a submerged submarine to be located accurately on the earth's surface.

A further object of our invention is to provide a star tracker having an optical system which translates a line of sight from the top of a mast above the surface of the water to the bottom of the mast in a submerged vessel without substantial error.

A still further object of our invention is to provide a star tracker having an optical system which substantially eliminates errors which otherwise would be introduced into the line of sight by whipping of the mast.

Other and further objects will appear from the following description.

In general our invention contemplates the provision of a star tracker having a plurality of optical elements so arranged in a mast that a ray or beam of radiation impinging on a surface of an element at the top of the mast at a given angle leaves a surface of an element located at the bottom of the mast at an angle substantially equal to the given angle. We so mount the optical elements of our tracker that whipping of the mast does not affect their operation. At the base of the mast we provide a plurality of optical elements carried by a platform which is stabilized in the plane of the horizon and which is oriented to a given reference direction. Detecting apparatus on the platform is operated to refer the translated ray or beam to the reference plane and to the reference direction to produce respective electrical signals for driving the mast in azimuth and for moving an optical element to provide a measure of the altitude and true azimuth of the celestial body from which the ray emanates. Our system may be employed with any type of radiation such for example as ultra violet, visible and infrared.

In the accompanying drawings to which reference is made in the following description and in which like reference characters indicate like parts in the various views:

FIGURE 1 is an elevation of a submarine provided with our star tracker.

FIGURE 2 is a fragmentary sectional view of the mast of our star tracker.

FIGURE 3 is a sectional view of the mast of our star tracker drawn on an enlarged scale and taken along the line 3—3 of FIGURE 2.

FIGURE 4 is a perspective view of the optical system and stabilized platform located at the base of the mast of our star tracker.

FIGURE 5 is an elevation of one form of optical element which may be used in the mast of our tracker.

FIGURE 6 is an elevation of another form of optical element which may be used in our star tracker.

FIGURE 7 is a perspective view of the form of mast optical element shown in FIGURE 6.

FIGURE 8 is a perspective view of a third form of mast optical element of our star tracker.

FIGURE 9 is a sectional view of the optical element shown in FIGURE 8 taken along line 9—9 of FIGURE 8.

FIGURE 10 is a schematic view illustrating the principles involved in supporting the mast optical elements in a manner to prevent substantial error from being introduced into the tracker owing to the whipping action of the mast.

FIGURE 11 is a schematic view showing the arrangement of the stable platform and detecting apparatus of our star tracker.

FIGURE 12 is a schematic view of a still further form of mast optical element of our star tracker.

FIGURE 13 is a schematic view of yet another form of mast optical element of our star tracker.

FIGURE 14 is a sectional view of another form of periscope optical system which may be used with our star tracker.

FIGURE 15 is a sectional view of a further form of the periscope optical system which may be used with our star tracker.

Referring more particularly to FIGURES 1 to 3 of the drawings, a submarine indicated generally by the reference character 10 with which our star tracker is used has a conning tower 12 and the usual retractable periscope 14. We provide the submarine with a retractable mast or second periscope indicated generally by the reference character 16. Mast 16 has an outer cylindrical housing 18, the top of which is closed by a head or cap 20 secured to the housing 18 by any convenient means such as bolts 22. A window 24 in the cap 20 permits radiation from a celestial body to pass into the mast 16 to impinge on the surface of an element of the optical system to be described hereinafter.

We mount a heat exchanger jacket 26 within the periscope housing by any convenient means such as a plurality of annular supports 28. The jacket 26 carries a tube 30 which supports the optical elements of our tracker in a manner to be described. We provide the interior of jacket 26 with a pair of vertical baffles 32 and 34 which divide the space within the jacket into two sections. As can be seen by reference to FIGURE 4, an inlet pipe 36 is adapted to admit water or other fluid maintained at a predetermined temperature to the interior of jacket 26 on one side of the baffles 32 and 34 and downwardly through jacket 26 to an outlet pipe 38 located at the base of the mast on the side of the jacket remote from pipe 36.

As has been explained hereinabove, in order that a line of sight stabilized in space be provided, it is necessary that a ray or beam of radiation entering the top of mast 16 at a given angle emerge from the bottom or base of the mast at the same angle. Referring to FIGURE 5, a ray or beam of radiation is shown entering a surface 40 of a prism indicated generally by the reference character 42. After passing through the prism, the ray emerges from a face 44 of the prism. We form the prism 42 from optical material having a relatively high index of refraction, such for example, as an index of refraction of greater than 1.8. We select this index of refraction together with the angle $\alpha$ of the entrance face 40 of the prism, such that the refracted entering ray approaches the prism side 46 at an angle which is greater than the critical angle of incidence, with the result that total reflection from the side 46 occurs. Similarly, total reflection from the side 48 occurs until, after a number of reflections from the sides of the prism, the ray emerges from face 44. If the faces 40 and 44 are parallel and the sides 46 and 48 are parallel, the ray emerging from face 44 will be parallel to the ray entering face 40 if the number of reflections within the prism is an even number. It will be appreciated that if the length of the prism is properly chosen, in view of the prism angle $\alpha$ and the index of refraction, the entire field of radiation entering face 40 will emerge from face 44 for a certain angle of the incoming ray. Periodically, as the angle of the incoming ray varies, the entire field will exit. In between the angles at which the entire field exits parallel to the incoming ray, part of the field exits at the proper angle while the rest of the energy either is internally reflected or emerges at an angle different from the correct exit angle.

We so select the face angle and index of refraction that the entrance ray will not hit the entrance face on the inside. We ensure total reflection at the prism sides by keeping above the critical angle of incidence for the index of refraction of the prism material. Further, we prevent an odd number of bounces or reflections from emerging from the exit face.

It is to be understood that as an alternate method of providing total refraction from the sides of the prism, we may coat the prism sides with a reflecting film which may be, for example, a silvered surface or an appropriate dielectric film. Preferably if this method is employed, we use a dielectric film of magnesium fluoride or zinc sulphide rather than a silvered surface to avoid the excessive loss occasioned by the silvered surface.

Where the angle of entrance of the ray, together with the index of refraction and face angle, are such that an odd number of reflections are produced, it is nevertheless desirable that an output ray parallel to the input ray be produced.

Referring to FIGURE 6, we have shown a form of our prism indicated generally by the reference character 50 which is formed by a pair of optical elements 52 and 54 separated by a thin film 56 of a dielectric material, such as magnesium fluoride or zinc sulphide. This film has a higher index of refraction than does glass and has a thickness of only a partial wave length to ensure that part of the energy impinging thereon is transmitted and part is reflected. The path of the transmitted energy is indicated by a full line in the figure, while the path of reflected energy is indicated by a broken line. Irrespective of the percentages of radiation which are transmitted and reflected by the film 56, after a number of reflections from the sides of the prism, both the transmitted and the reflected ray contain approximately the same amount of energy. As will be apparent from the figure, if the transmitted ray has an odd number of reflections so that it is totally reflected from the exit face of the prism, the reflected ray is phase shifted at the film 56 to approach the exit face at an angle which produces an outgoing ray parallel to the incoming ray, as long as the entrance and exit faces of the prism are parallel. While a metallic film may be used in place of the film 56, preferably we employ a dielectric film because of its much lower loss. We apply silver coatings 58 and 60 near the entrance and exit faces of the prism to permit the ray to bounce off the side without requiring impossibly small critical angles for the prism material. By using multiple reflections, we obtain a very high percentage of the incident energy from the prism.

It will be appreciated that the optical elements of our system may take a number of forms, depending upon the required use. FIGURE 7 shows a prism indicated generally by the reference character 62 which has four sides perpendicular to each other with the other sides parallel and with the end faces parallel. If two side faces of this prism are frosted, the view is limited in that direction.

FIGURES 8 and 9 show a form of prism indicated generally by the reference character 64 having a pair of elements 66 and 68, separated by a film 70. In this form of prism the image travels spirally through the prism giving a wide angle of view in all directions.

FIGURE 12 shows a further form of our prism, indicated generally by the reference character 63, similar to that shown in FIGURE 6. In the form of prism shown in FIGURE 12, however, rather than separating two optical elements along their entire length by a film 56, we saw or otherwise cut the prism 63 for a predetermined distance along its length and fill the cut with a reflecting film 65. We have found that this form of prism also gives the desirable results outlined in connection with the form of prism shown in FIGURE 6.

It is to be understood that while we have shown prisms for the optical elements of our tracker, mirrors could as well be employed.

From the foregoing it will be seen that if we could place a single elongated prism in our mast 16 and maintain the faces parallel at all times, we would produce an optical system having a stabilized line of sight. As has been explained hereinabove in operation of the submarine 10, mast 16 whips with the result that the faces of a single prism placed in the mast would not remain parallel. If a plurality of prisms, each having a relatively short length as compared with the length of the mast 16, were placed in the mast along its axis, the bending of an individual prism would be negligible, with the result that the respective faces of each prism would remain substantially parallel. In other words, individual prisms can be considered as rigid as far as bending is concerned.

It is to be noted that in such a series of prism elements, the exit face of one prism need not remain parallel to the entrance face of the succeeding prism in order that a ray of radiation entering the entrance face of the first prism be parallel with the ray leaving the exit face of the succeeding prism, as long as the end faces of the respective prisms are parallel. That is, if in a series of prisms the entrance and exit faces of each prism remain parallel, a ray entering the entrance face of the first prism will be parallel to the ray leaving the exit face of the last prism, irrespective of bending in the member, such as mast 16 carrying the prisms.

While the action of the series of prisms will not be affected by bending of the mast, it may be influenced by loading of the prisms under the action of inertia forces caused by whipping of the mast. Under the action of these inertia forces, each prism may be considered as a uniformly loaded beam. We have discovered that if the prism is supported at predetermined locations along its length, the end faces of the prism will remain parallel even under the action of these inertia forces. Referring to FIGURE 10, we have indicated in broken lines a beam having a length $l$, uniformly loaded and rigidly supported at its ends. Such a beam has a sag which may be represented by the angle $\theta_1$, defined by the relationship $$(1) \quad \theta_1 = \frac{Wl^3}{24EI}$$

where W is the total load on the beam, E is the modulus of elasticity of the beam, and I is the moment of inertia of the beam. FIGURE 10 also shows in dot-dash lines a uniformly loaded beam of length $l'$ supported at a point intermediate its length. The hog of this beam represented by the angle $\theta_2$ is defined as $$(2) \quad \theta_2 = -\frac{Wl_a^2}{4EI}$$

where "$a$" is the length of beam on either side of the support. If the portion of the beam outboard of the support is considered as a cantilever, the deflection of this cantilever is represented by the relationship $$(3) \quad \theta_3 = -\frac{Wa^3}{6EI}$$

In full lines in FIGURE 10 we have shown a beam supported at a pair of spaced points between its ends, such that the length of the beam between the supports is "$l$" and the length of beam extending outboard from either support is "$a$." The center section of this beam may be considered first as a uniformly loaded beam rigidly supported at its ends and as a simple beam unloaded except for moments applied at its ends by cantilever end sections. The end sections may be considered as uniformly loaded cantilevers. This in effect is the sum of the three beam conditions outlined hereinabove so that the end deflection of the beam indicated in full lines in FIGURE 10 may be represented by the relationship $$(4) \quad \theta = \theta_1 + \theta_2 + \theta_3 = \frac{Wl^3}{24EI} - \frac{Wla^2}{4EI} - \frac{Wa^3}{6EI} = \frac{W}{24EI}(l^3 - 6la^2 - 4a^3)$$

We have selected our condition for $\theta$ equal to zero so that the ends of the beam are parallel under the load and in this case:

$$(5) \quad l^3 - 6la^2 - 4a^3 = 0$$

Equation 5 may be solved for "$l$" by known algebraic methods to produce the relationship:

$$(6) \quad l = \frac{l'}{\sqrt{3}}$$

From Equation 6 it will be seen that the beam is supported at points equally distant from its respective ends, such that the length "$l$" between the supports is equal to the total beam length "$l'$" divided by the square root of three. In order that the prism end faces always remain parallel, we support our prisms at spaced points along their lengths, the distances between the points being determined by Equation 6.

Referring to FIGURES 2 and 3, each of the prisms, such as the prism indicated generally by the reference character 50, is supported by a pair of brackets 72 within the tubular support 30. Each support bracket 72 has a pair of legs 74 secured to the inner surface of support 30 by means such as screws or the like 76. The brackets 72 support the prisms 50 at points along the lengths of the prisms in accordance with the relationship expressed in Equation 6, so that the distance between the supports is equal to the overall length of the prism divided by the square root of three.

As has been explained hereinabove, we provide our star tracker with means for referring the stabilized line of sight to the plane of the horizon and for comparing the line with a predetermined true reference direction to obtain the true altitude and true azimuth of the celestial body being observed. Referring to FIGURES 4 and 11, a pair of bearing brackets 78 and 80, carried by the submarine frame, support bearings 82 which rotatably support respective stub shafts 84, one of which is shown in FIGURE 4, the axes of whch are aligned with the roll axis of the submarine. Gimbal 86 carries a pair of stub shafts 88, one of which can be seen in FIGURE 4, having axes aligned with an axis perpendicular to the roll axis to permit a pitch gimbal 90 carried by shafts 88 to move about the pitch axis of the submarine. We form the pitch gimbal 90 with a plurality of legs 92 which carry the heading platform 94 of our stabilized platform assembly. A pair of ring bearings 96 and 98 rotatably support the platform 100 of our stabilized platform assembly. A flexible annular ring 108 formed of any suitable material such, for example, as rubber, closes an opening 110 in housing 106 through which the lower end of housing 30 extends.

A gyroscope assembly 112 carried by platform 100 is adapted to produce an electrical signal proportional to the movement of the submarine relative to its roll axis. An electrical channel 114 conducts this signal to a roll servomotor 116 supported on bracket 78. The shaft of motor 116 drives a gear 118 which meshes with and drives a gear 120 carried by shaft 84 for rotation therewith. It will be seen that as the submarine moves about its roll axis, the electrical signal generated by the gyromechanism 112 energizes motor 116 to maintain platform 100 stabilized about the roll axis of the submarine. Ring bearings 102 and 103 rotatably support an optical element housing 106 having a base 104 for movement in azimuth within the pitch gimbal 90. A synchronous transmitter 122 driven by the shaft 84 remote from the shaft 84 carrying gear 120 transmits the roll error signal to a remote location, if desired. We have indicated the mechanical connection between motor 116 and the platform 100 schematically by the reference character 124 in FIGURE 11.

A second gyroscope assembly 128 carried by platform 100 is arranged to produce an electrical signal proportional to the movement of the submarine about its pitch axis. An electrical channel 130 conducts the signal generated by gyroscope assembly 128 to a servomotor 132 supported by any convenient means (not shown) on roll gimbal 86. The shaft 134 of motor 132 carries for rotation with it a gear 136 which drives a gear 138 supported on one of the shafts 88 for rotation with the shaft. The signal generated by gyroscope 128 energizes motor 132 to drive gear 136 and gear 138 to move the pitch gimbal 90 about the pitch axis to stabilize the assembly with respect to this axis. A synchronous transmitter 140 carried by the shaft 88 remote from the shaft carrying a gear 138 supports a synchronous transmitter 140 which produces an electrical signal representing the movement of the pitch gimbal 90 about the pitch axis.

From the system thus far described, it will be seen that the stabilized platform 100 carried by the pitch ring is stabilized in the plane of the horizon. Our system has means for orienting the platform 100 to a selected reference direction which, may for example, be true north. We mount a horizontally disposed gyroscope assembly 142 on platform 100. When the submarine yaws in azimuth, the gyroscope 142 produces an electrical signal representing the deviation of the platform 100 from the true direction. An electrical channel 144 conducts the signal from gyroscope 142 to a servomotor 146 carried by platform 94. A gear 148 carried by a shaft 150 of motor 146 for rotation with it drives a gear 152 formed integrally with and below the stabilized platform 100. The signal produced by motor 142 energizes the motor 146 to drive the stabilized platform 100 in azimuth to keep the platform oriented to a selected reference direction such, for example, as true north. A synchronous transmitter 154 supported by platform 94 has a shaft 156 carrying for rotation with it a gear 158 driven by gear 152. It will be appreciated that gear 158 is continuously oriented to the reference direction. Thus, one winding of transmitter 154 is oriented to the reference direction while the other winding is oriented to the heading of the ship. We have indicated the respective mechanical connections between motor 132 and the stabilized platform 100 and between motor 132 and the synchronous transmitter 140 by the reference characters 160 and 162 in FIGURE 11. The mechanical connections between motor 146 and the stabilized platform and between motor 146 and transmitter 154 are identified by respective reference characters 164 and 166 in FIGURE 11.

Platform 100 carries an azimuth servomotor 168 energized in a manner to be described to drive housing 106 in azimuth to orient mast 16 to the proper direction. The shaft 170 of motor 168 carries a gear 172 for rotation with it which drives a gear 174 formed on a portion 176 of housing 106 extending below base 104 as viewed in FIGURE 4. Gear 174 drives a gear 178 carried by the shaft 180 of a synchronous transmitting 182 supported on the stabilized platform 100. It will be appreciated that one winding of the synchronous transmitter 182 is oriented to the azimuth direction to which mast 176 is driven. We have indicated the mechanical connection between motor 168 and transmitter 182 by the reference character 184 in FIGURE 11. Linkage 184 may also drive a synchronous transmitter 185 for producing an electrical signal representing the true azimuth of the body being observed.

We provide a long path for the ray of radiation emerging from the mast 16 to ensure a long focal length for the optical system to afford a large field of view. A ray of radiation emerging from the exit face of the prism 50 located at the bottom of mast 16 strikes the reflecting surface of a mirror 186 carried on a shaft 188 rotatably supported by any convenient means in the side of housing 106. A motor 190 drives a gear 192 which drives a second gear 194 carried by shaft 188 for rotation with the shaft. We generate an electrical signal in a manner to be described hereinafter to energize motor 190 to rotate shaft 188 to orient the beam emerging from mast 16 to the plane of the horizon to reduce to zero the signal fed to motor 190. At the same time, the rotation of motor 190 provides an indication of the altitude of the celestial body being observed. Any suitable mechanical linkage indicated by the reference character 195 in FIGURE 11 may be employed to couple motor 190 to a synchronous transmitter 196 to produce an electrical signal representing the altitude of the celestial body.

After being reflected from the surface of mirror 186, the ray of radiation strikes a mirror 198 which reflects the ray to a mirror 200 through a lens 202. Mirror 200 directs the beam to a mirror 204 which in turn reflects the ray to a mirror 206. Mirror 206 together with a pair of mirrors 208 and 210 directs the beam to a detecting device 212 which may be, for example, an image orthicon tube. Respective channels 211 and 213 feed the output of the tube 212 to a monitor 215 having a screen 217 to produce a spot on the screen representing the orientation of the beam of light. Cross hairs 219 and 221 on the screen 217 indicate at their point of intersection a point corresponding to the reference direction and to the horizontal plane. A first synchronous transmitter 223, the rotor of which is manually moved by a crank 225, produces an electrical signal which is fed to the azimuth drive motor 168 by a channel 214. Crank 225 is manually operated to cause the spot on screen 217 to move until it arrives at cross hair 219 thus indicating that the beam is alined with the reference direction. The output signal from transmitter 223 represents the deviation of the beam from the selected reference direction. A second synchronous transmitter 227, the rotor of which is adapted to be driven by a crank 229 produces an electrical signal which is fed to the altitude drive motor 190 by a channel 216. Rotation of crank 229 moves the spot on screen 217 until it registers with line 221 indicating that the beam has been translated to the horizontal plane. The electrical signal on channel 216 represents the deviation of the beam from the horizontal plane. It will be seen that transmitters 223 and 227 respectively produce output signals representing the deviation of the light beam from the selected reference direction and from the horizontal plane.

We provide our system with means for orienting the mast 16 to the relative bearing of the body being observed. As has been explained hereinabove, transmitter 154 continuously produces an electrical signal representing the true heading of the submarine. We conduct this signal to one winding of the differential transmitter 182 through an electrical channel 217. The linkage 184 between the azimuth drive motor and the motor 182 orients the rotor of transmitter 182 to the azimuth of the body being observed. As a result of this operation, transmitter 182 produces an output signal representing the relative bearing of the body being observed with respect to the submarine. An electrical channel 218 conducts this signal to a synchronous machine 220 which produces an output signal which energizes the mast drive motor 222 through a channel 224. A mechanical feedback 226 reduces the output signal of machine 220 to zero as long as the mast is oriented to the relative direction being represented by the signal from differential 182. Motor 222 drives the mast 16 through a linkage 228 of a type known in the art.

In operation of our star tracker, radiation from a celestial body being observed enters the entrance face of the optical element such as a prism 50 located at the top of the mast. As has been explained hereinabove, we so select the index of refraction and face angles of the elements 50 that a ray of radiation entering the prism is totally reflected from the prism sides. By use of a dielectric film, such as the film 56, a relatively large percentage of the radiation entering the prism leaves the exit face of the prism even where only an odd number of reflections occur within the prism. Also has has been explained, we so mount the optical element such as prisms 50 that the entrance and exit of the faces of each prism remain parallel to each other even under the forces of inertia resulting from whipping of the mast.

With the arrangement of optical elements described, a ray of radiation entering an element at the top of the mast at a given direction in space, exits from the element at the base of the mast at the same direction in space. In other words, our mast optical system provides a line of sight stabilized in space.

After emerging from the optical element at the bottom of the mast, the ray is reflected by our system of mirrors to the detecting device 212. If the beam emerging from the mast 16 is not oriented in azimuth to the direction to which the platform 104 is oriented, transmitter 223 is operated to produce an electrical signal fed to motor 168 for moving the platform 102 to orient the platform in azimuth to the direction of the beam to give an indication of the true azimuth of the celestial body. If a mirror 186 is so oriented that it does not move the incident beam to a plane parallel to the plane of the horizon, the transmitter 227 is operated to produce a signal fed to motor 190 to drive mirror 186 until the beam is oriented to a plane parallel to the plane of the horizon. In this manner, our system continuously tracks a celestial body to indicate its true azimuth and elevation at all times. The output signal from the synchronous transmitter 154 represents the true heading of the submarine. As this signal is fed to differential 182, one winding of which is oriented to the true azimuth of the platform 104, the transmitter 182 produces an electrical signal representing the relative bearing of the celestial body. This signal may be used to drive the mast to orient it to the relative bearing of the body.

Referring now to FIGURE 13 in another form of our prism, indicated generally by the reference character 67, we cut the prism adjacent its exit face 69 in a central longitudinal plane parallel to a pair of sides of the prism. In this cut we dispose a triangular film 71 of a reflecting material such as silver. As viewed from the top in FIGURE 13 the film 71 covers approximately half the area in the plane mentioned hereinbefore from a line 73 to the exit face 69 of the prism. The remainder of this area is clear. This form of our prism provides a more uniform distribution of light in the field of view. It eliminates undesirable dark bands in the field of view.

If desired, we may substitute one of the forms of prism 62, 64, or 67, respectively, shown in FIGURES 7, 8, 12, and 13 for the prisms 50 in mast 16. Alternately, we may substitute other optical devices, such as mirrors for the prisms 50. Rather than requiring internal reflections in the prisms by total reflection, the prism surface could be coated with a reflecting medium. It will be appreciated also that the prism sides could be coated to prevent extraneous light from entering the system.

Referring now to FIGURE 14, we have shown another form of optical system which may be used to translate a line of sight parallel to itself from the top to the base of the housing 18 of our mast 16. This system includes a single prism 240 carried in a plastic jacket 242 formed of a suitable plastic material such, for example, as a polyamide, polyethylene, or polyvinyl plastic. We support the prism 240 and its jacket 242 in a steel tube 244 which we mount in the housing 18 on a pair of spaced brackets 246 and 248. We space the brackets 246 and 248 within the housing 18 in accordance with the relationship expressed in Equation 6 hereinabove. In this manner we ensure that the respective end faces 250 and 252 of the prism 240 remain parallel to each other at all times. As has been explained in this form of our mast optical system rather than employing a plurality of individual prisms 50, we use a single prism 240.

As has been explained hereinabove, in the absence of the semi-reflecting film such, for example, as the film 56, the image viewed at the exit face of the prism is crossed by a number of dark bands. This results from the fact that certain of the rays reflected from the prism sides do not emerge in the field of view of the observer. The intermediate semi-reflecting films permit rays to emerge in the areas of the dark bands by reflecting a percentage of these rays toward the exit face in the field of views of the observer. This result is achieved, however, at the expense of the brightness of the areas between the dark bands, since a percentage of the rays which normally would emerge in these areas are reflected away from the exit face by the film. The over-all result of eliminating the bands of total darkness is, however, desirable.

We have discovered one means by which the bands of total darkness may be eliminated without detracting from the brightness of the remainder of the image. Referring now to FIGURE 15, in this form of our invention, we use a single prism 254 supported by the plastic jacket 242 carried in tube 244 supported on brackets 246 and 248. It is to be noted that in this form of prism 254 the prism angle at the respective end faces 256 and 258 is a right angle. We mount respective mirrors 260 and 262 on adjacent sides of the prism 254 at the entrance face 256 by any convenient means such as an adhesive or the like. Rays striking the surfaces of the mirrors 260 and 262 are reflected toward the entrance face 256 to permit them to enter the prism. We have indicated such a ray by the dot-dash line in FIGURE 15. A ray which strikes the entrance face 256 directly without first being reflected from a mirror enters the prism in the normal manner. We have indicated such a ray by broken lines in FIGURE 15. It will be understood that in this form of our mast optical system we do not employ an intermediate reflecting film in the prism 254.

Adjacent the exit face 258 we mount a second pair of mirrors 264 and 266 on sides of the prism 254 opposite to the sides on which we mount mirrors 260 and 262. This we may accomplish by any convenient means such as by an adhesive or the like. From the figure it will be seen that the ray represented by the dot-dash line strikes the surface of mirror 254 from which it is reflected to emerge from the optical system in the same direction in which it entered the system as it struck mirror 262. The ray represented by the broken line emerges from the exit face 258 in the same direction as it entered the entrance face 256. It will be appreciated that the broken line ray corresponds to rays which normally would emerge in the field of view of an observer. The dot-dash line ray represents those rays which normally would be lost. The mirror system in effect increases the prism length for those rays which normally would be lost, thus eliminating the bands of total darkness without detracting from the brightness of the image areas between these points. It is to be understood that the spacing of the brackets 246 and 248 in FIGURE 15 is determined by Equation 6 as was the case in the form of the invention in FIGURE 14.

If desired, a temperature control jacket such as the jacket 26 shown in the form of our invention in FIGURE 2 could as well be employed in the forms of our mast optical system shown in FIGURES 14 and 15.

It will be seen that we have accomplished the objects of our invention. We have provided a star tracker which permits an accurate celestial sight to be taken from a submerged submarine. In this manner, our star tracker may be employed to locate a submerged submarine accurately on the earth's surface. Our star tracker translates a line of sight from the top to the bottom of an elongated mast without introducing substantial error owing either to whipping or bending of the mast.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for determining the position of a celestial body including in combination an elongated mast, an optical system carried by said mast for transmitting a line of sight substantially without change in direction from the top to the base of said mast to permit a beam of radiation from said body to pass through said system without change in the azimuth of said beam, means providing a true reference direction adjacent the base of said mast, means for translating said beam to said reference direction and means responsive to said translating means for producing an indication of the azimuth of said body.

2. Apparatus as in claim 1 in which said means providing said true reference direction includes a stabilized platform and in which said apparatus includes a detecting system for producing an output signal representing the deviation of said beam from said reference direction, and in which said translating means comprises a second optical system for directing said beam from said mast optical system to said detecting system and means for driving said second optical system to translate said beam to said reference direction.

3. Apparatus for determining the position of a celestial body including in combination an elongated mast, an optical system carried by said mast for translating a line of sight substantially without change in direction from the top to the base of said mast to permit a beam of radiation from said body to pass through said system without change in its elevation angle, means providing a horizontal plane adjacent the base of said mast, means for translating said beam to said horizontal plane, and means responsive to said translating means for producing an indication of the elevation angle of said body.

4. Apparatus as in claim 3 in which said means providing said horizontal plane includes a stabilized platform and in which said apparatus includes a detector for producing an output signal representing the deviation of said beam from said horizontal plane, a second optical system for directing said ray from said mast to said detector, and means for driving said second optical system to translate said beam to said horizontal plane.

5. Apparatus for determining the position of a celestial body including in combination an elongated mast, an optical system carried by said mast for translating a line of sight substantially without change in direction from the top to the base of said mast to permit a beam of radiation from said body to pass through said system without change in its azimuth and elevation angle, means providing a horizontal plane adjacent the base of said mast, means providing a true reference direction in said horizontal plane, first means for translating said beam to said reference direction, second means for translating said beam to said horizontal plane, means responsive to said first translating means for producing an indication of the azimuth of said body and means responsive to said second translating means for producing an indication of the elevation angle of said body.

6. Apparatus for determining the position of a celestial body including in combination an elongated mast having a top and a base, a first optical system carried by said mast for translating a beam of radiation substantially without change in direction from the top to the base of said mast, a platform, means for supporting said platform adjacent said mast base, means for stabilizing said platform in the horizontal plane, means for orienting said platform to a predetermined reference direction, a detector, a second optical system for directing said beam of radiation from the base of said mast to said detector, means for supporting said detector and second optical system on said platform for movement in azimuth, said means including said detector for producing a first electrical signal representing the deviation of said beam from said reference direction and means for driving said support means to translate said ray to said reference direction.

7. Apparatus as in claim 6 in which said detector includes means for producing a second electrical signal representing the deviation of said beam from said horizontal plane and in which said second optical system includes an element for moving said ray in elevation and means for driving said optical element to translate said ray to the horizontal plane.

8. Apparatus as in claim 6 in which said first optical system includes a plurality of optical elements each having a face through which a beam of radiation enters the element and an exit face through which a beam of radiation leaves the element and means for supporting each of said elements with its respective entry and exit faces substantially parallel under the action of an inertia load resulting from whipping of said mast.

9. Apparatus as in claim 6 including means for orienting said mast to the relative bearing of said celestial body.

10. In an optical system for translating a line of sight substantially without change in direction from the top to the base of a mast adapted to whip, an optical element having an entry face through which a beam of radiation enters the element and an exit face through which a beam of radiation leaves the element and means for supporting said element in said mast at a pair of spaced points; with its entry and exit faces substantially parallel under the action of an inertia load on said element resulting from whipping of said mast.

11. An optical system as in claim 10 in which said support means includes a pair of spaced supports, each of said supports being located on said element at points equally distant from the respective entry and exit faces with a distance between the supports equal to the length of the element divided by the square root of three.

12. An optical system as in claim 10 in which said optical element is a prism formed of a radiation transparent material having an index of refraction and a face angle such that total reflection occurs from the prism sides.

13. An optical system as in claim 10 in which said optical element is a prism comprising a pair of sections and a semi-reflecting film separating said sections.

14. An optical system as in claim 10 in which said optical element comprises a pair of parallelopiped prism sections and a semi-reflecting film separating said sections.

15. An optical system as in claim 10 in which said optical element comprises a pair of prism sections, each having a triangular cross-sectional shape and a semi-reflecting film separating said sections.

16. An optical system as in claim 10 in which said element comprises a prism formed with a slit and a semi-reflecting film disposed in said slit.

17. An optical system as in claim 10 in which said elements is a prism having an entrance face and an exit face and respective reflecting coatings carried by said prism adjacent the entrance and exit faces.

18. An optical system for translating a line of sight substantially without change in direction from the top to the bottom of a mast adapted to whip including in combination a plurality of optical elements, each of said elements having an entry face through which a beam of radiation enters the element and an exit face through which a beam of radiation leaves the element and respective means for supporting each of said elements with its entry and exit faces substantially parallel under the action of an inertia load on said elements resulting from whipping of said mast.

19. In a system of the character described, a prism formed of a radiation transparent material, a top face, a bottom face parallel to said top face, an entrance face, an exit face parallel to said entrance face, the angle of said entrance face and the index of refraction of said transparent material being such that total reflection occurs from the top and bottom faces, a slit having a plane parallel to said top and bottom faces, said plane being located midway between said top and bottom faces and a film of reflecting material disposed in said slit and having an area equal to approximately half the area of said slit.

20. In a system of the character described, a prism formed of a radiation transparent material, a top face, a bottom face parallel to said top face, an entrance face, an exit face parallel to said entrance face, the angle of said entrance face and the index of refraction of said transparent material being such that total reflection occures from the top and bottom faces, and a triangular film of reflecting material disposed in a plane parallel to said top and bottom faces, said plane being located midway between the top and bottom faces and said triangular film having its apex adjacent said exit face.

References Cited in the file of this patent

UNITED STATES PATENTS

| | | | |
|---|---|---|---|
| 954,707 | Spear | 88/1* | Apr. 12, 1910 |
| 1,360,735 | Du Mazuel | 35/33 | Nov. 30, 1920 |
| 2,442,564 | Heyer | 88/102 | June 1, 1948 |
| 2,462,925 | Varian | 23/46 | Mar. 1, 1949 |
| 2,718,704 | Mariani | 35/69 | Apr. 27, 1955 |
| 2,734,269 | Claret | 250/238 | Feb. 14, 1956 |
| 2,762,123 | Schultz et al. | 2-22/22-1 | Sept. 11, 1956 |
| 2,867,393 | Burley | 250/253 | Jan. 6, 1959 |

FOREIGN PATENTS

| 908,053 | France | 88/72 | Aug. 13, 1945 |
|---|---|---|---|